March 13, 1945.  J. J. BYLO  2,371,149
METHOD OF LOADING AND UNLOADING CARGO
Filed Sept. 23, 1942   2 Sheets-Sheet 1
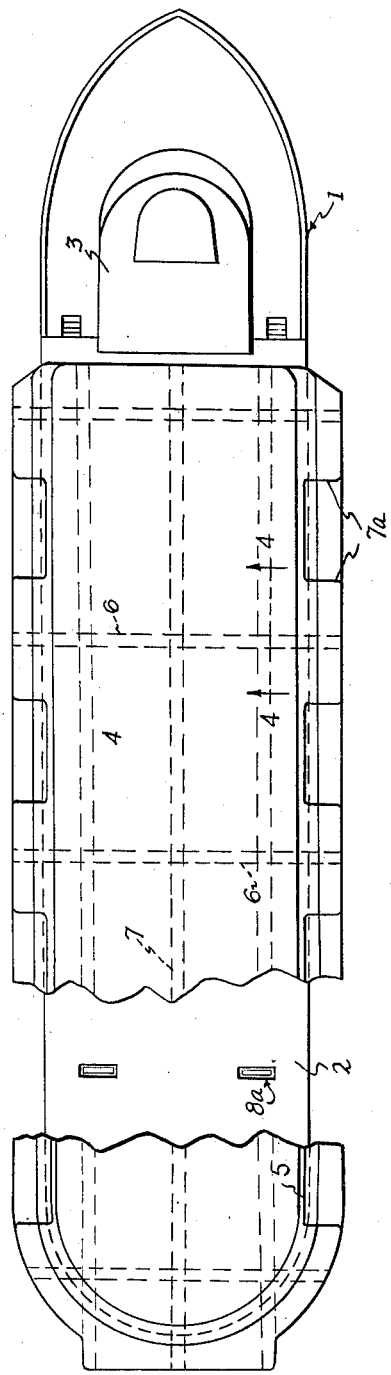
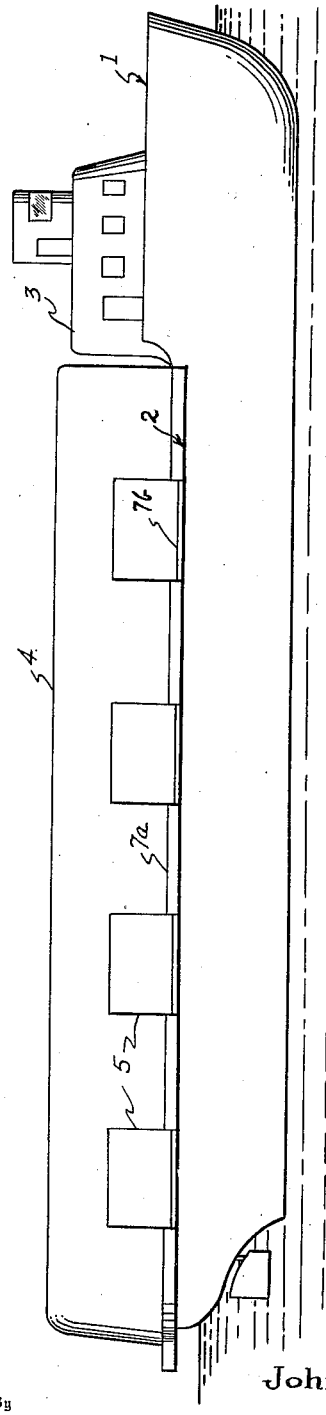
Inventor
John J. Bylo
By
J. S. Murray
Attorney March 13, 1945. J. J. BYLO 2,371,149
METHOD OF LOADING AND UNLOADING CARGO
Filed Sept. 23, 1942 2 Sheets-Sheet 2
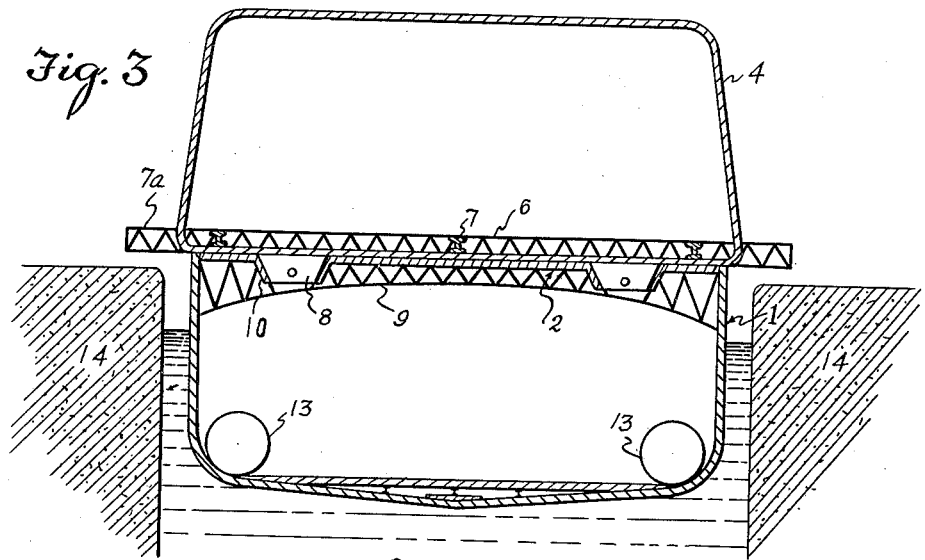
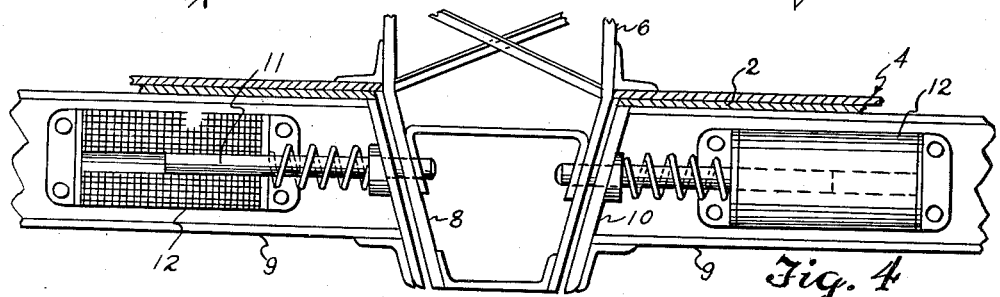
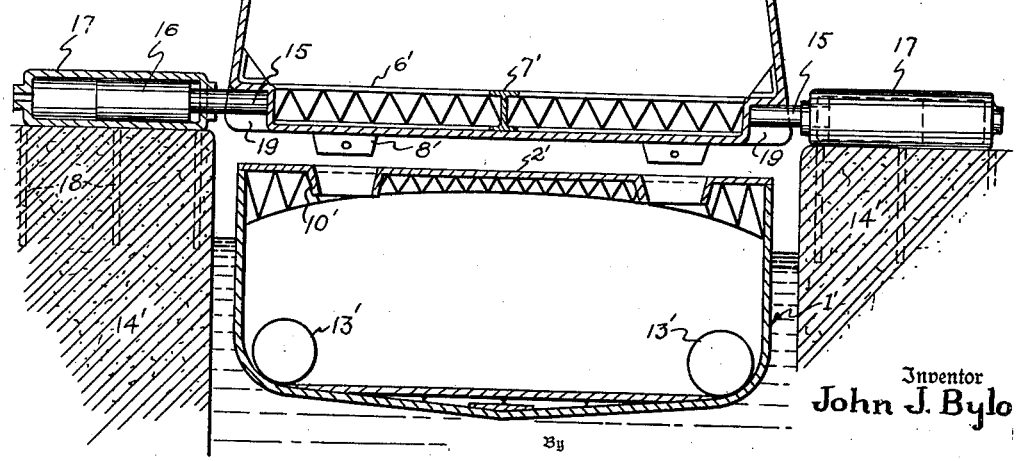
Inventor
John J. Bylo
By
J S Murray
Attorney Patented Mar. 13, 1945

2,371,149

UNITED STATES PATENT OFFICE 2,371,149

METHOD OF LOADING AND UNLOADING CARGO

John J. Bylo, Detroit, Mich.

Application September 23, 1942, Serial No. 459,392

8 Claims. (Cl. 214—12)

This invention relates to methods of loading and unloading cargo vessels.

Considerable time is consumed in delivering cargo to and discharging it from vessels, this being especially true of cargos other than bulk material, as vehicles, machinery, or general package freight. It quite commonly requires at least a month to unload and load large general cargoes, as for example, 2,000 tons. Since both a vessel and the majority of its crew are idle during loading or unloading of cargo, it is obviously highly desirable to minimize time thus consumed.

An object of the invention is to greatly expedite loading and unloading of cargo vessels by equipping them with demountable holds or cargo platforms preferably proportioned to receive full cargos, and by varying the buoyancy of such vessels to transfer the holds or platforms to or from docks suitably designed for that purpose.

Another object is to reduce the problem of stevedore employment and facilitate more careful loading and unloading of cargo by permitting this work to be done during transit periods of cargo vessels.

In case the transit periods of vessels exceed their present loading and unloading periods, it is obvious that more time will be had for loading and unloading if this can be done during transit periods. Furthermore, present practice is to carry freight from the receiving shed to the dock, from which it is eventually delivered into the vessel and properly distributed. My demountable cargo receiver permits delivering cargo directly thereto from the freight shed or vice versa.

A further object is to adapt a demountable cargo receiver to occupy a bridging relation to two docks spaced to form a slip receiving a vessel on or from which the receiver is to be loaded or unloaded, such relation permitting variations in the buoyancy of the vessel to be used in transferring the load and thus eliminating necessity for cumbersome and expensive machinery.

A further object is to provide for securely anchoring a demountable cargo receiver to the deck of a vessel, so that it may withstand rough weather.

These and various other objects are attained by the construction hereinafter described and illustrated in the accompanying drawings, wherein:

Fig. 1 is a top plan view of a vessel equipped with a demountable cargo hold in accordance with the invention.

Fig. 2 is a side elevational view of such vessel.

Fig. 3 is a cross sectional view of said vessel occupying a slip and ready to transfer the cargo hold to docks at each side of the slip.

Fig. 4 is a cross sectional view taken upon the line 4—4 of Fig. 1 and showing how the cargo hold is anchored to the vessel.

Fig. 5 is a view similar to Fig. 3 but disclosing a modified type of dock installation.

In these views, the reference character 1 designates a vessel having a cargo deck 2 extending the full width of the vessel and for at least a major portion of its length, said deck in the illustrated construction extending from the forecastle 3 to the stern. Removably seated on the deck 2 is a cargo hold 4 forming a complete and weather-tight enclosure, and preferably having a width and length exceeding that of the deck so as to project laterally and rearwardly some distance beyond the vessel. Suitable doors 5 provide for the delivery of cargo to and from the hold and said doors may be provided in either or both sides of the hold and also in the stern thereof, if desired. A plurality of trusses 6 or other reinforcing structures extend transversely through the bottom portion of the hold and are so connected to lengthwise trusses or beams 7 as to form a frame work adequate to support the entire hold together with its maximum intended load. Said trusses extend at their ends beyond the cargo hold to reinforce laterally projecting supports 7a for said hold, disposed between the doorways thereof. Relatively thin platforms 7b extend across the doorways interconnecting the supports 7a and serving as gang planks. Each truss 6 has one or more downwardly projecting anchorage members 8, underlying the hold and gradually reduced in size toward their lower ends, the deck 2 being formed with openings 8a accommodating said anchorage members. Incorporated in or secured to the beams or trusses 9 which carry the deck 2 are sockets 10 corresponding in shape to and receiving the members 8. Each anchorage member is adapted to be locked in its socket 10 by one or more bolts 11 slidable fore and aft of the vessel and it is preferred to adapt all of said bolts for actuation in unison to or from their locking positions. This may be done electrically, hydraulically, or pneumatically, there being shown in Fig. 4 solenoids 12 for electrically controlling two of said bolts. Obviously, all of the solenoids may be instantaneously energized by merely closing a switch, not shown. Water ballast tanks 13 are fixed at suitable points in the vessel hull to provide for a material raising or lowering of the vessel by discharging water from or admitting it to said tanks. No attempt is made to illustrate pumps and piping incident to a water ballasting system since these are well known.

For purpose of unloading the hold 4, the vessel 1 enters a slip formed between two docks 14 (Fig. 3) and having a width exceeding only slightly that of the cargo hold so that the supports 7a overhang said docks. Surface level of the docks is predeterminedly such that said supports will have a reasonable upward clearance from the docks as a vessel laden with a maximum tonnage enters the slip. After operating the bolts 11 to release the cargo hold from the deck, water ballast is now taken into the tanks 13 until resultant submerging of the vessel seats the supports 7a on the two docks, thus transferring the cargo hold as a load from the vessel to the docks. Submergence is continued until the anchorage members have suitable upward clearance from the deck 2 and the vessel may then leave the slip. Removal of cargo from the hold 4 may proceed as soon as the latter has been deposited as described upon the docks, and such removal may continue during the ensuing trip of the vessel or perhaps during several short trips.

In taking on a cargo hold, either at the unloading point or some other terminus, the vessel will enter a slip other than that used for unloading but duplicating the latter. The cargo hold to be taken on will occupy a bridging relation to the slip now entered and no regulation of ballast will ordinarily be necessary since the proper deck level was established prior to leaving the slip wherein the vessel was unloaded. When the deck has been located in proper vertical registration with the loaded cargo hold, sufficient ballast is discharged to lift the vessel so that the cargo hold will be transferred as a load to the deck 2 and the supports 7a will have adequate clearance above the docks. The vessel may now proceed to its point of cargo delivery, after the bolts 11 have been locked with the anchorage members 8.

The modification of the invention illustrated in Fig. 5 conforms to preceding description as regards vessel 1', deck 2', cargo hold 4', beams 7', anchorage members 8', trusses 9', sockets 10', tanks 13' and docks 14'. There are eliminated however the laterally projecting supports 7a of the first-described construction and supports for the cargo hold, when docked, are formed by plungers 15 oppositely mounted on the two docks. A suitable provision is made for reciprocating said plungers, the illustrated provision comprising pistons 16 connected to said plungers and operating in cylinders 17 anchored strongly to the docks as indicated at 18. In one limiting position of said plungers, they project over the slip, as shown in Fig. 5, to engage in sockets 19 formed in the ends of the trusses 6', said trusses in this modification lying fully within the cargo hold. Thus the plungers 15 are adapted to support said hold in a bridging relation to the slip, being projected into the sockets 19 preliminary to transferring the cargo hold as a load from the vessel to the docks and being withdrawn from said sockets preliminary to a reverse transfer of the cargo hold. Obviously, admission and escape of fluid to and from the several cylinders 17 may be controlled by a valve or valves common to all the cylinders so that the plungers may be projected or retracted in unison. This modification adds considerable to complexity and cost of the dock installation, as compared to construction first described, but obtains time-saving advantages of the demountable hold without necessitating laterally projecting supports on the hold. Another advantage of the plunger type supports is that they lend themselves to individually handling cargo receivers when a plurality of same are carried on a vessel deck.

It is to be noted that the demountable cargo receiver does not necessarily form a hold or enclosure, and for some purposes, said receiver may be merely a demountable platform. For example, my improved system has an important application to car ferries, the loading platform in such case being equipped with suitable tracks as in present practice, and the provision for quick transfer of such platform from ferry to docks or vice versa being effected by either of the provisions which have been described and illustrated. In present practice, car ferries must lie idle in their slips for long periods, while their tracks are being filled.

It is a highly important feature of my system that the demountable hold or platform requires no shifting other than its transfer by gradual vertical motion from a vessel to the docks or vice versa. Said hold or platform when built for use on large cargo vessels will, at least in many instances, be of great dimensions and considerably elongated and it would not be feasible to so reinforce such a large structure as to permit shifting it laterally either during or subsequent to transferring it to a dock or docks. It is entirely feasible however to build such a platform or hold of a strength adequate to carry its cargo and to be seated in a bridging relation to two docks.

It is of course feasible to equip a single vessel with a number of demountable receivers distributed lengthwise of the deck 2. The saving of time is greatest, however, when a full cargo is handled by a single receiver. A plurality of demountable receivers is desirable only in case partial cargos must be picked up or delivered at different ports or docks.

By progressively reducing the size of the anchorage members 8 or 8' and of their sockets 10 or 10' as these members extend downwardly, entrance of the anchorage members into said sockets is facilitated, and any slight inaccuracy of registration in the receiver and deck as they approach each other is automatically corrected.

The term "dock," as used in foregoing description and following claims, is inclusive of a pier or pilaster, since one of the two docks required by the invention need serve no other purpose than that of a partial support for the cargo receiver.

What I claim is:

1. The method of loading or unloading a vessel equipped with a demountable cargo receiver, consisting in varying the buoyancy of the vessel to raise or lower the level of the vessel with relation to an adjacent dock, and utilizing such variation of deck level to lift the receiver from the dock and deposit it on the vessel or lift it from the vessel and deposit it on the dock.

2. The method of loading or unloading a vessel equipped with a demountable cargo receiver, consisting in disposing the vessel between two docks, varying the buoyancy of the vessel to raise or lower the level of a deck designed to seat the receiver, and utilizing such variation of deck level to lift the receiver from the docks and deposit it on the deck or to lift it from the deck and deposit it on the docks.

3. The method of loading a cargo receiver on a vessel, consisting in disposing the receiver in a bridging relation to two docks spaced to form a slip proportioned to accommodate the vessel, disposing the vessel within said slip with a deck underlying said receiver, and increasing the buoyancy of the vessel to raise said deck and thus load the receiver thereon.

4. The method of unloading a cargo receiver from a vessel, consisting in entering the vessel in a slip formed between two docks, and lowering the receiver to seat it jointly on said docks by reducing buoyancy of the vessel.

5. The method of unloading a vessel equipped with a demountable receiver having laterally projecting supports, consisting in entering the vessel in a slip formed between two docks, with a deck of the vessel underlying said receiver and with said supports overhanging the docks, and decreasing the buoyancy of the vessel to first seat the receiver supports on the docks and then establish vertical clearance between the vessel and receiver.

6. The method of employing demountable cargo receivers to facilitate the unloading and loading of a vessel, consisting in disposing a vessel equipped with a demountable receiver in a slip formed between two docks, decreasing the buoyancy of the vessel to deposit said receiver jointly on said docks, then entering the vessel in another and similar slip, formed between docks whereon a cargo receiver has previously been deposited, a deck of the vessel being disposed in an underlying relation to the last-mentioned receiver, and increasing the buoyancy of said vessel to transfer the last-mentioned receiver from the docks to said deck.

7. In a method of unloading a vessel equipped with a demountable cargo receiver, the steps of entering the vessel in a slip formed between two docks, actuating supports installed on said docks toward the receiver to assume positions for supporting the receiver, and seating the receiver on said supports by reducing buoyancy of the vessel.

8. The method set forth in claim 7, said supports being actuated in unison.

JOHN J. BYLO.